April 6, 1926. 1,579,950
H. C. PETERS
WHEEL
Filed July 10, 1925

Inventor,
Henry C. Peters.

By Victor J. Evans
Attorney

Witness:

Patented Apr. 6, 1926.

1,579,950

UNITED STATES PATENT OFFICE.

HENRY C. PETERS, OF NORTH MIDDLETOWN, KENTUCKY.

WHEEL.

Application filed July 10, 1925. Serial No. 42,809.

*To all whom it may concern:*

Be it known that I, HENRY C. PETERS, a citizen of the United States, residing at North Middletown, in the county of Bourbon and State of Kentucky, have invented new and useful Improvements in Wheels, of which the following is a specification.

This invention relates to a spring wheel, the general object of the invention being to provide spring spokes for the wheel, said spokes connecting the felly with the hub portion of the wheel, thereby giving the wheel resiliency without the use of a pneumatic tire.

This invention also consists in certain other features of construction and in the combination and arrangement of the several parts, to be hereinafter fully described, illustrated in the accompanying drawings and specifically pointed out in the appended claim.

In describing my invention in detail, reference will be had to the acompanying drawings wherein like characters denote like or corresponding parts throughout the several views, and in which:—

Figure 1:
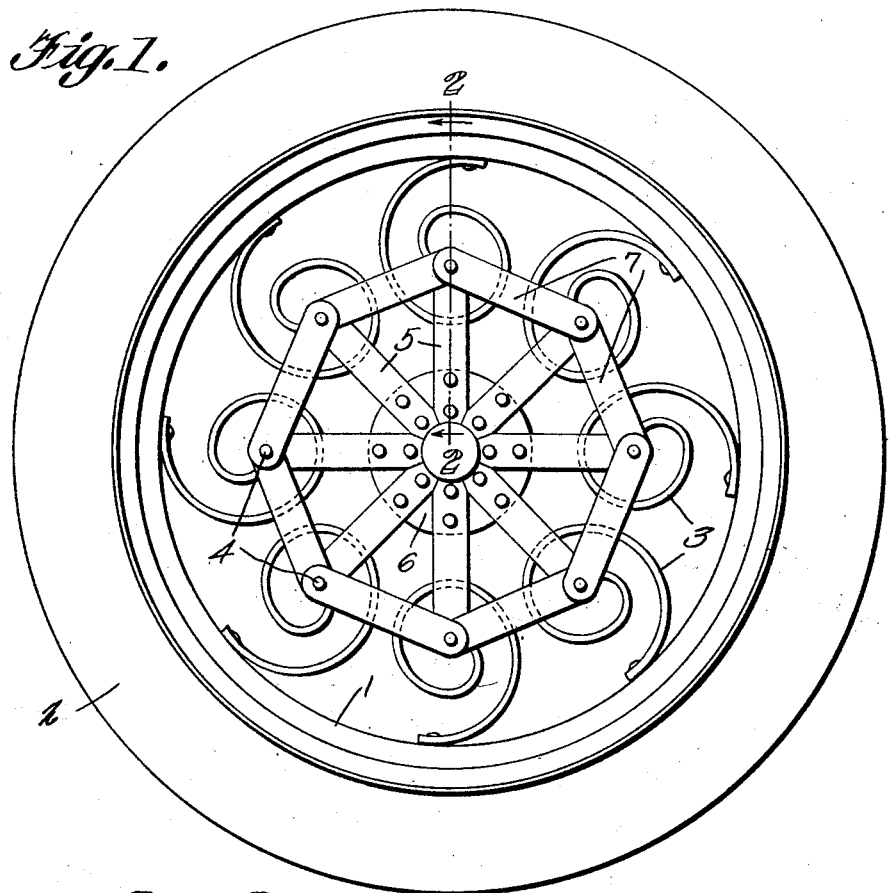
Figure 1 is an elevation of the improved wheel.
Figure 2:
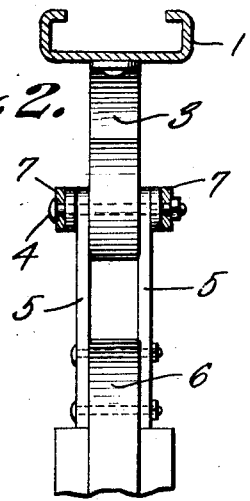
Figure 2 is a section on line 2—2 of Figure 1 with the tire removed.
Figure 3:
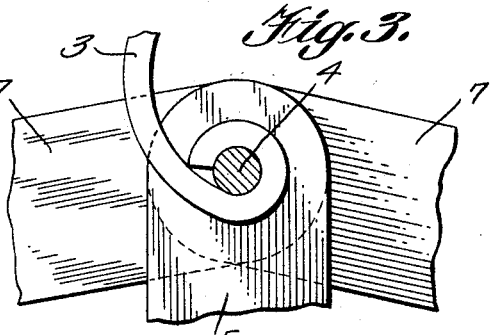
Figure 3 is an enlarged detail view.

In these views, 1 indicates the felly of a wheel, this felly suporting any desired kind of a tire 2. The outer ends of spiral-shaped springs 3 are fastened to the inner face of the felly and their inner ends are formed with eyes which engage pintles 4, each of which is carried by a pair of flat members 5 which are bolted or otherwise fastened to the hub 6 of the wheel. The outer ends of these members 5, at each side of the wheel, are connected together by the links 7.

Thus it will be seen that the felly is connected with the inner or hub portion of the wheel by a plurality of spokes which are formed of spiral springs so that the hub portion will have movement relative to the felly. This arrangement will make the wheel a resilient one and thus make easy riding of the vehicle and eliminate the use of pneumatic tires, though such tires can be used if desired.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A wheel of the class described, comprising a felly, a plurality of spiral springs having their outer ends connected with the felly and having eyes at their inner ends, pintles passing through the eyes, a pair of flat members having perforations in their outer ends to receive the ends of each pintle, means for fastening the inner ends of said flat members to a hub part of the wheel and links connecting the outer ends of the members, at each side of the wheel, together, said links engaging the ends of the pintles.

In testimony whereof I affix my signature.

HENRY C. PETERS.